United States Patent [19]

McGugan

[11] Patent Number: 4,460,201
[45] Date of Patent: Jul. 17, 1984

[54] PIPE CONNECTORS

[75] Inventor: John D. McGugan, Aberdeen, Scotland

[73] Assignee: Hunting Oilfield Services (UK) Limited, Aberdeen, Scotland

[21] Appl. No.: 560,278

[22] Filed: Dec. 13, 1983

Related U.S. Application Data

[63] Continuation of Ser. No. 233,575, Feb. 11, 1981, abandoned.

[30] Foreign Application Priority Data

Feb. 18, 1980 [GB] United Kingdom ................ 8005419
Jul. 8, 1980 [GB] United Kingdom ................ 8022337

[51] Int. Cl.³ .......................................... F16L 21/06
[52] U.S. Cl. .................................. 285/18; 285/365; 285/373
[58] Field of Search ............... 285/419, 373, 366, 365, 285/411, 410, 407, 18

[56] References Cited

U.S. PATENT DOCUMENTS

| | | | |
|---|---|---|---|
| 1,043,806 | 11/1912 | Dahl | 285/373 X |
| 1,883,900 | 10/1932 | Harris | 285/189 X |
| 2,690,939 | 10/1954 | Whaley | 285/365 X |
| 2,777,714 | 1/1957 | Lamphere | 285/410 |
| 3,041,088 | 6/1962 | Brandon, Jr. | 285/373 X |
| 3,625,549 | 12/1971 | De Vries | 285/373 X |
| 4,106,799 | 8/1978 | Oetiker | 285/365 |
| 4,138,148 | 2/1979 | Zaremba | |
| 4,146,261 | 3/1979 | Edmaier | |
| 4,163,571 | 8/1979 | Nash | |
| 4,265,471 | 5/1981 | Nash | 285/365 X |

FOREIGN PATENT DOCUMENTS

| | | | |
|---|---|---|---|
| 511690 | 12/1953 | Belgium | 285/407 |
| 1360863 | 7/1974 | United Kingdom | |

Primary Examiner—Thomas F. Callaghan
Attorney, Agent, or Firm—Watson, Cole, Grindle & Watson

[57] ABSTRACT

A connector for connecting the abutted end portions of two pipes includes a ring having a pair of radially inwardly extending surfaces directed towards each other and each for engagement with a radially outwardly extending surface on a respective pipe end. The surfaces on the pipe ends are directed away from the respective pipe ends and the connector includes operating means for causing radial expansion of the ring to disengage the ring from one of the pipes, the ring remaining engaged with the other pipe. To this end the corresponding surfaces on the ring and the other pipe have a greater radial extent than the surfaces on the ring and the one pipe, so that the former surfaces remain engaged for all conditions of use of the connector. The connector is particularly suited for connecting the pipe sections of a pipe string for use in the drilling and/or completion of offshore oil or gas wells, particularly where the pipe string is to be subject to high axial load for example in pile driving.

25 Claims, 13 Drawing Figures

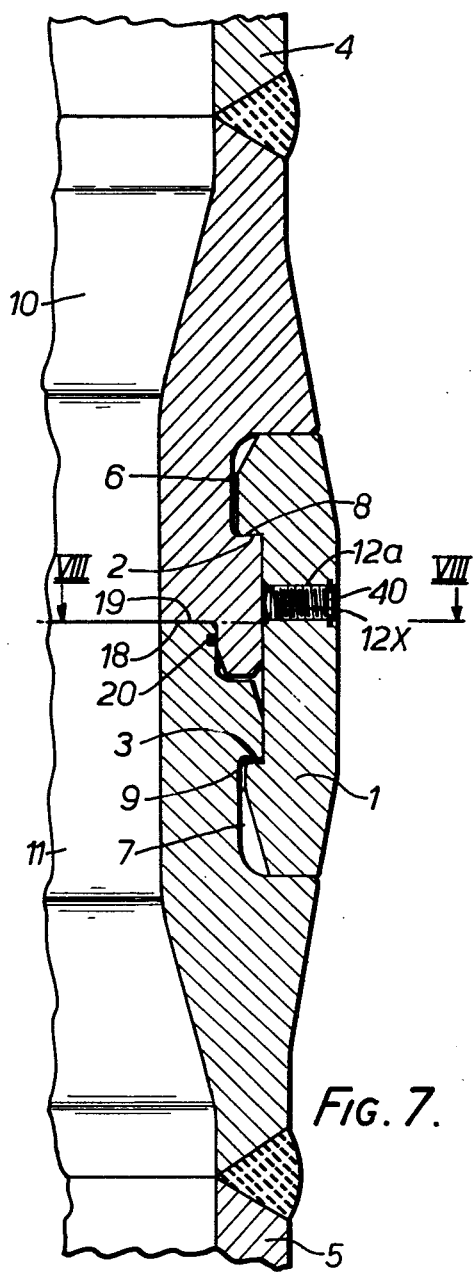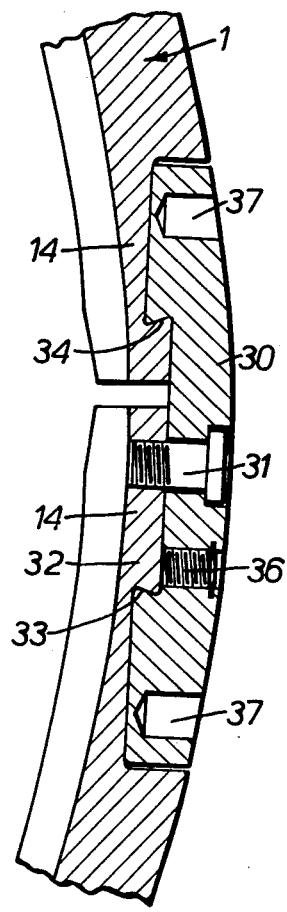
FIG. 7.
FIG. 8.

FIG. II.

PIPE CONNECTORS

This application is a continuation of application Ser. No. 233,575, filed Feb. 11, 1981 and now abandoned.

BACKGROUND OF THE INVENTION

1. Field of the Invention

The present invention relates to pipe connectors particularly but not exclusively for interconnecting pipe sections to form a pipe string for use in drilling and/or completion of offshore oil or gas wells, and particularly to a connector providing a connection capable of withstanding high axial loads, for example in pile driving.

2. Description of the Prior Art

Numerous connectors for these purposes are known, many in the form of pin and box joints having telescoping surfaces provided with devices between the surfaces which interengage to lock the parts of the joints together. Such joints are complicated to manufacture and therefore expensive, complex to use and therefore not ideal for offshore conditions, and do not always provide a joint capable of withstanding high axial loads.

There are numerous other pipe connectors which were not designed for the above purposes and are not therefore suitable.

SUMMARY OF THE INVENTION

The present invention is intended for use in connecting the abutted end portions of two pipes each of which is provided with a radially outwardly extending surface directed away from the respective pipe end.

The pipe connector according to the present invention is characterised by the provision of a split annular ring for surrounding the abutted pipe ends substantially completely and having a pair of radially inwardly extending surfaces directed towards each other and each for engagement with a respective surface on the pipe end portions, one of the surfaces of the ring having a greater inward radial extent than the other surface and being in use permanently engaged with the corresponding one of the pipe end portion surfaces, and operating means for causing the radial dimensions of the ring to change to permit engagement and disengagement of the ring from the other pipe end portion.

In use the split annular ring is thus permanently mounted on one of the pipe end portions. To connect that pipe end portion with another, it is thus merely a matter of arranging the ring in its radially expanded condition, bringing the two pipe ends into abutment, and causing or permitting the ring to contract to its radially contracted condition in which it engages both pipe end portions.

Preferably the ring is in its radially contracted condition when relaxed and the operating means cause radial expansion of the ring, the ring being resiliently radially expandable so that it will return to its contracted condition on release of the operating means.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

In the drawings:

FIG. 7 is a vertical section similar to that of FIG. 2 showing a further embodiment of connector according to the present invention;

FIG. 8 is a section on the line VIII—VIII of FIG. 7 showing locking means for the ring;

FIGS. 1 to 6 show a pipe connector for connecting the ends of two pipes or pipe sections of a pipe string for use in the drilling and/or completion of an offshore oil or gas well and which is capable of withstanding pile driving forces.

Figure 1:
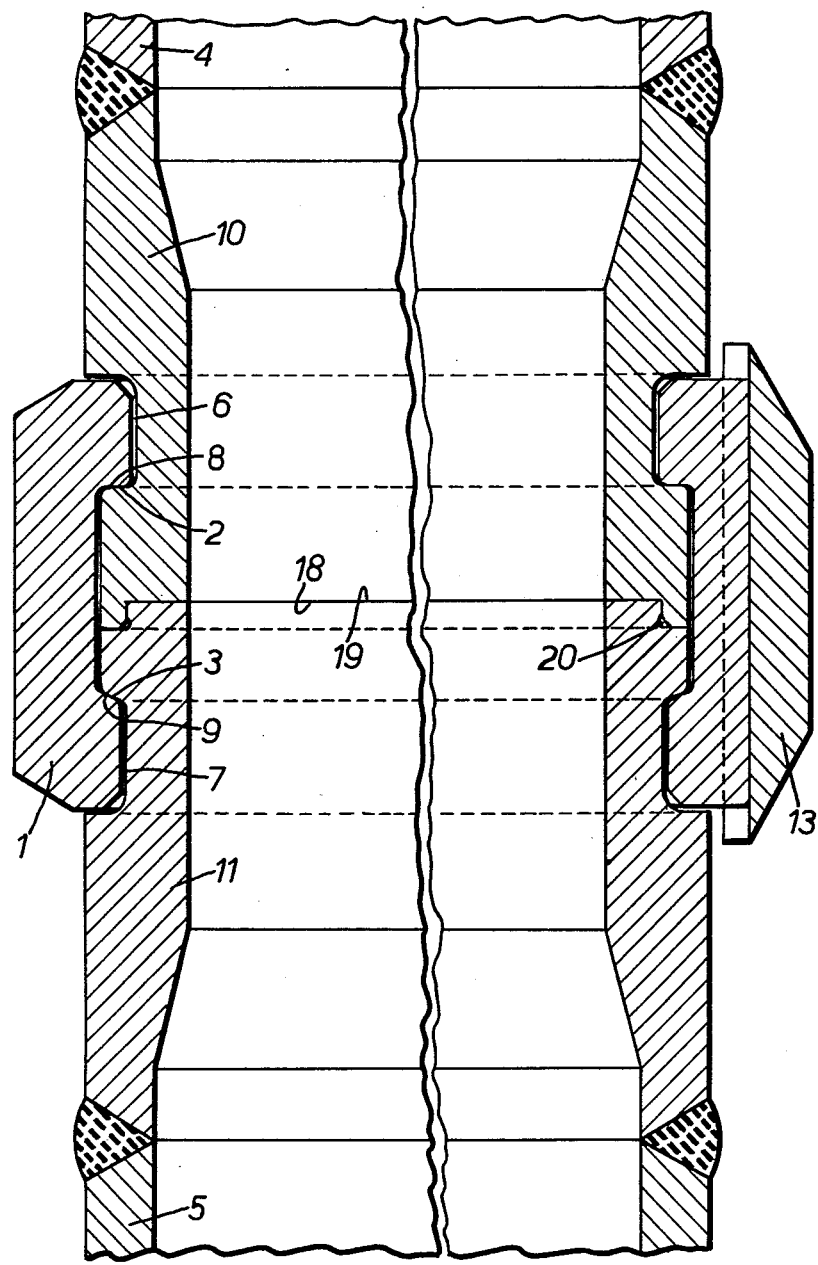
FIG. 1 is an axial section through the ends of two pipes which have been connected together using a connector according to the present invention.

The pipe connector comprises a split annular member or ring 1 which has a generally U-shaped radial section, the arms of the U of which provide radially inwardly extending surfaces 2,3 which are directed towards each other. The two pipes 4,5 are provided adjacent the ends to be abutted and connected with annular grooves 6,7 providing oppositely directed radially outwardly extending surfaces 8,9. In a modification these surfaces 8,9 may be provided by flanges on the ends of the pipes 4,5. As shown, these surfaces 8,9 are provided on pipe end members 10,11 which are fixed, e.g. by welding, to the ends of the pipes 4,5 to be connected together. The surfaces 8,9 may alternatively be provided on integral end parts of the pipes.

Figure 2:
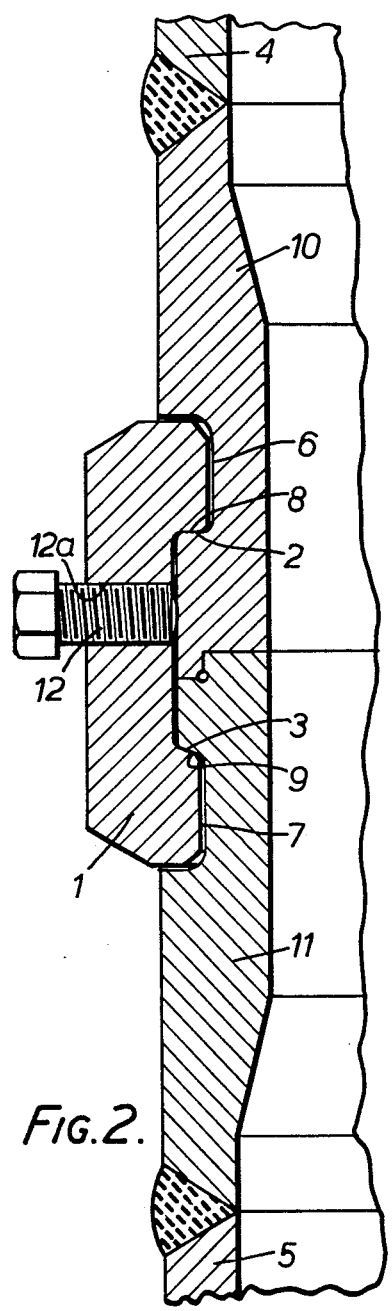
FIG. 2 is an axial section through part of the connector of FIG. 1 but in an axial plane angularly spaced from that of FIG. 1.

In use, as shown in FIGS. 1 and 2, the ring 1 surrounds the abutted pipe end portions with the surfaces 2.3 of the ring engaging the respective surfaces 8,9 of the pipe end portions to hold the ends of the pipe together. In this embodiment, the end portions of the pipes are postively clamped together by the ring 1 by inclining one or both of the pairs of surfaces 2,8 and 3,9 in a direction such that the surfaces converge outwardly of the pipes so as to create a wedge effect of the ring on the pipe end portions. Preferably only one pair of surfaces 3,9 are inclined, for example at 12°, to a radial plane perpendicular to the axis of the pipes, the other pair of surfaces 2,8 lying in a radial plane.

The ring 1 is, in its relaxed state, dimensioned so as to engage the pipe end portions as shown in FIGS. 1 and 2. For uncoupling the pipes, the ring is made radially resiliently expansible and, to uncouple the pipes, is radially expanded to disengage surfaces of the ring and pipe end portions. However surface 2 of the ring has a greater radial inward extent than surface 3 so that surfaces 2,8 have a greater radial overlap than surfaces 3,9. For uncoupling, the ring is radially expanded sufficient to disengage surface 3 from surface 9 but not so as to disengage surface 2 from surface 8. Thus in use the ring remains permanently mounted on the pipe 4. When the ring has been radially expanded to disengage surface 3 from surface 9, pipe 5 can be withdrawn by axial movement away from pipe 4.

It is for this reason that in this embodiment the surfaces 2,8 extend generally in a radial plane perpendicular to the axis of the pipes so that they are permanently in contact and are guided one along the other during radial expansion and contraction of the ring.

Figure 3:
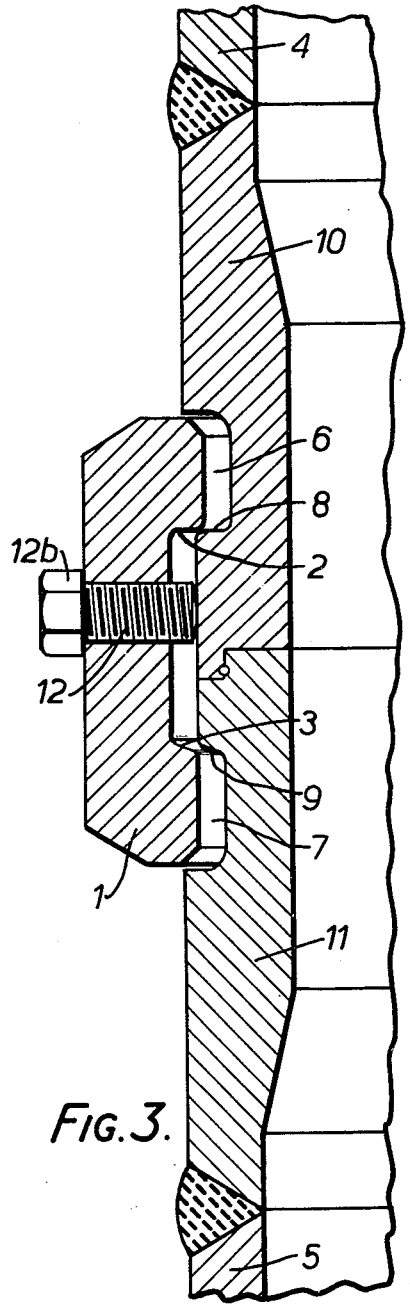
FIG. 3 is an axial section similar to that of FIG. 2 but showing the connector during assembly of the pipes.

The ring 1 is radially expanded by operating means which, in this embodiment, comprise a plurality of operating members angularly spaced apart around the ring and which are operated to force the ring to expand relative to the pipe 4. For example each operating member may comprise a threaded member 12 which is engaged in a threaded radial opening 12a in the ring 1. The members 12 may be arranged to be permanently engaged with the ring 1. When the connector is in use, as shown in FIGS. 1 and 2, the members 12 are retracted in openings 12a either so that they are out of contact with pipe 4 or so that they merely contact pipe 4 but without force. To disengage the pipe ends or to permit abutment and engagement of two pipes, the members 12 are screwed into the ring 1, the inner ends bearing on the outer surface of the end of the pipe 4 to force the ring 1 to expand relative to the pipe 4, as shown in FIG. 3. To ensure that the ring 1 is expanded sufficient for surface 3 to be clear of surface 9 but so that surfaces 2,8 are still in engagement, the members 12 may each be provided with a head 12b which abuts the outer surface of the ring 1 when the ring 1 has been sufficiently expanded. The heads 12b may be polygonal for engagement by a suitable tool for their operation.

Figure 4:
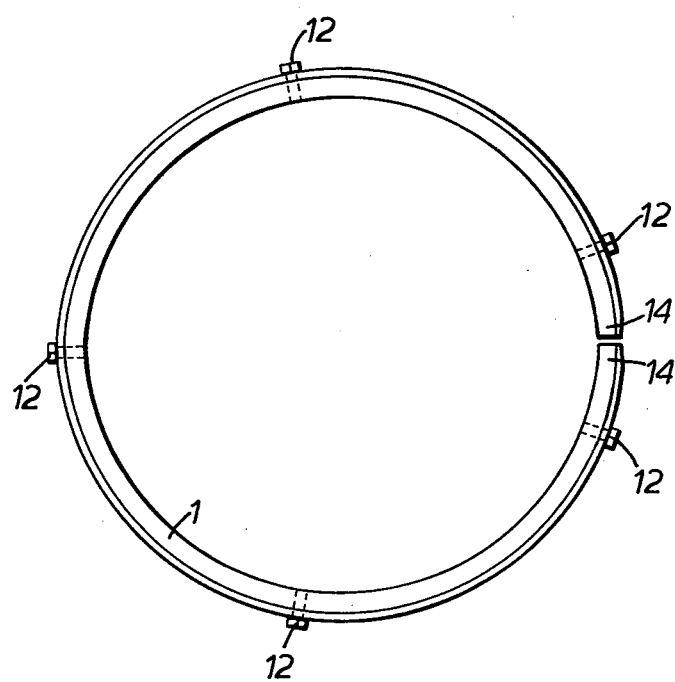
FIG. 4 is a plan view of the ring of the embodiment of FIG. 1 to a reduced scale.

The number of threaded members 12 provided will depend on the overall dimensions of the ring and should be such as to ensure that the ring is evenly expanded around the pipe 4. For example, five such members 12 may be provided in threaded openings 12a as shown in FIG. 4, two of the members 12 being arranged adjacent the split ends 14 of the ring, a third being arranged diametrically opposite the split and the remaining two being arranged intermediate the first and third members. A further two members may be provided between the third member and the fourth and fifth members.

Figures 5, 6:
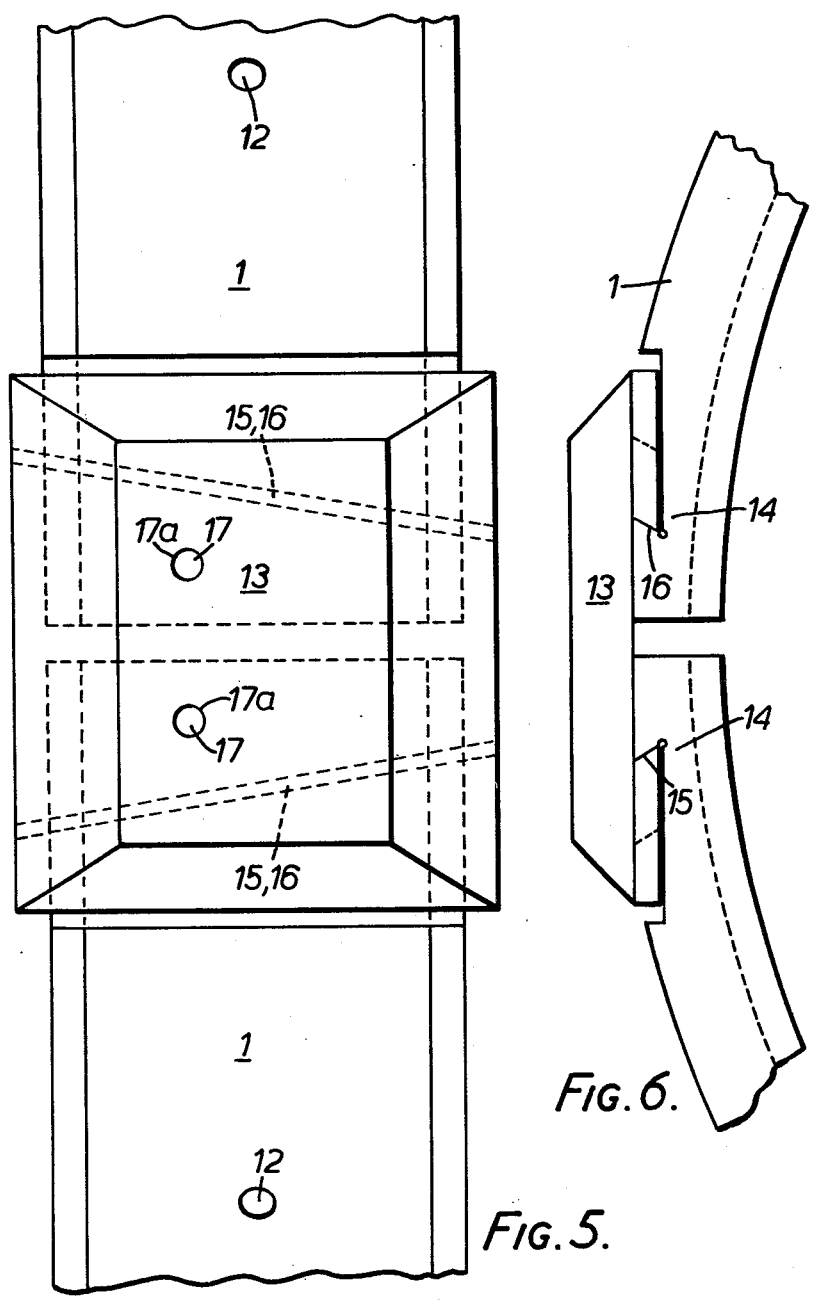
FIG. 5 is a side elevation of part of the connector of FIG. 1 showing locking means therefor.
FIG. 6 is a plan view of the part of the connector shown in FIG. 5.

To ensure that the ring 1 does not expand when in use, a locking member may be provided to hold the end portions 14 of the ring at the split together. The locking member 13 may for example be as shown in FIGS. 5 and 6. The end portions 14 of the ring at the split are provided with oppositely peripherally directed mutually inclined dovetailed or undercut surfaces 15, the locking member 13 which extends over the end portions 14 of the ring having correspondingly inclined correspondingly dovetailed surfaces 16 which are directed towards each other and in use engage surfaces 15. To lock the ring, the member 13 is slid in a direction parallel to the axis of the pipes over the end portions of the ring to the position shown in FIGS. 5 and 6. The dovetailing or undercutting of surfaces 15,16 ensures that the member 13 cannot inadvertently be removed in a radial direction. To ensure that the member 13 remains in place on the ring, threaded members 17 may be threaded into threaded openings 17a in the member 13 to frictionally engage the outer surface of the end portions of the ring.

To uncouple the pipes 4,5, the threaded members 17 are first removed and this is followed by removal of the locking member 13. The threaded members 12 are then operated to expand the ring 1 and this automatically frees the pipe 5 from the ring 1 so that the pipe 5 can then be removed by axial movement. To couple the pipe 5 to the pipe 4, the above steps are repeated in reverse order, the end of the pipe 5 being first abutted against the end of the pipe 4.

The abutted end surfaces 18,19 of the pipes, or pipe end members where provided, may be stepped as shown in FIGS. 1 to 3 and provided with an annular seal 20 to ensure sealing of the joint.

While in the above described embodiment, the use of a wedging effect of the ring 1 on the pipe ends produced by inclining the surfaces 3,9, to more firmly bring the pipe ends together as the ring is engaged around the pipe ends, is attractive, it has the disadvantage that the ring may in use be subject to a radial force. Where the pipe contains fluid under pressure, the pressure of the fluid will tend to force the pipes apart in an axial direction. This force is converted to a radial bursting force by the inclination of surfaces 3,9. Thus in designing the ring 1, it must be made capable of withstanding such a radial force and the locking means also have to be designed to be capable of withstanding the loading resulting from this radial bursting force. In the following embodiment, this bursting force is used to ensure engagement of the ring with the pipe ends. The connector is shown in FIGS. 7 to 10 and again comprises a generally U-shaped ring 1 provided with radially inwardly extending surfaces 2,3 which face each other and which in use engage radially outwardly extending surfaces 8,9 as in the preceding embodiment. As shown, the grooves 6,7 on the pipe end portions are provided within stepped portions at the ends of the pipes so that, as shown, when the ring 1 is engaged with the ends of the pipes its external surface is generally flush with the external surface of the ends of the pipes.

In this embodiment, one, or as shown both, of the pairs of surfaces 2,8 and 3,9 are inclined to a plane perpendicular to the axis of the pipes 4,5 in a direction such that the surfaces converge inwardly of the pipes and such that the ring 1 has a tendency to move into engagement with the pipe ends. In use, when the pipes are filled with fluid under pressure tending to move the pipes apart axially, the resultant force on the ring 1 will engage the ring more firmly on the pipe ends.

As in the preceding embodiment, the ring 1 is provided with threaded members 12x but in this embodiment the members 12x have a length such that they are received wholly within the threaded openings 12a when the ring 1 is in its relaxed condition engaging the pipe ends. The outer ends of the members 12x may be slotted or otherwise provided with means for engagement by a tool for rotating them and the threaded openings 12a are provided with an abutment member 40 in their outer end portions against which the member 12x abuts in its outermost position clear of contact with the pipe 4. The members 12x may be arranged around the ring 1 as shown in FIG. 4 of the preceding embodiment and indeed the members 12x may be used in the preceding embodiment in place of the members 12.

To ensure that the ring 1 cannot be inadvertently expanded when in use, a locking means may be provided for holding the split ends of the ring together.

Figure 9:
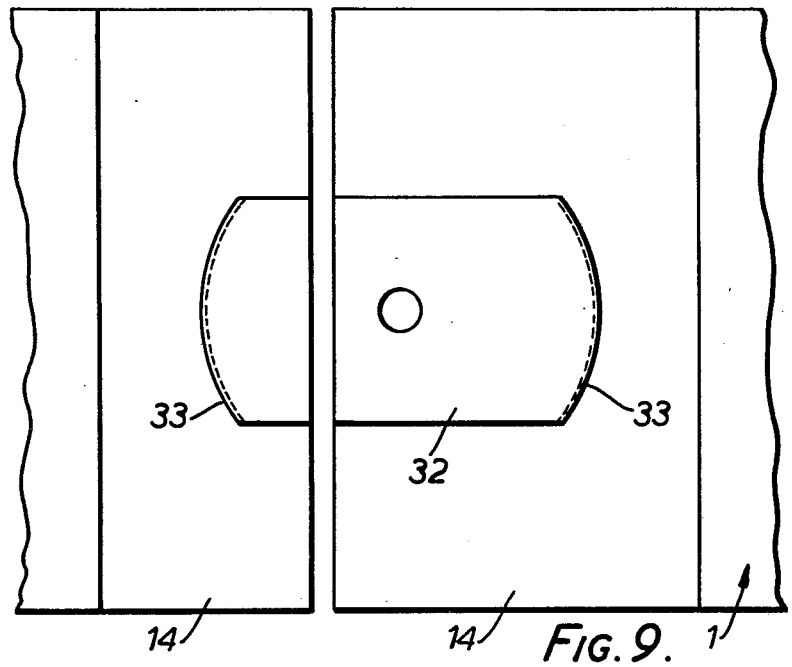
FIG. 9 is an elevation of the split end portions of the ring of FIG. 8.
Figure 10:
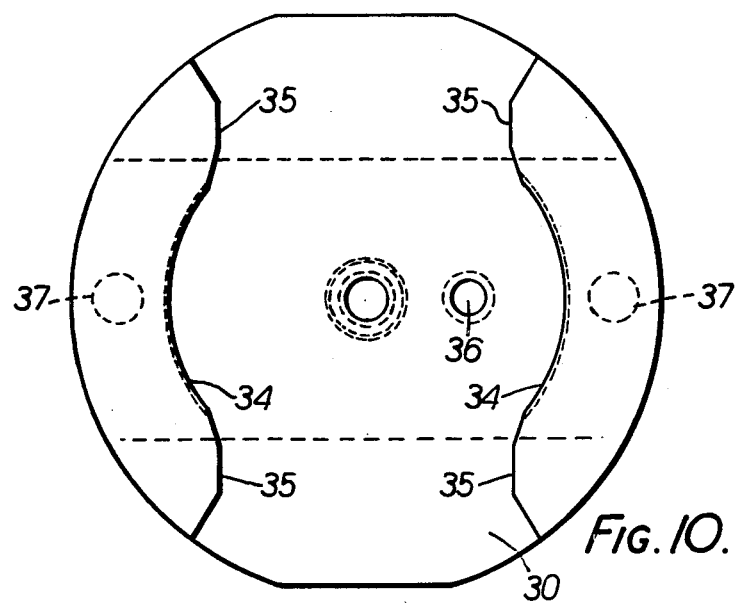
FIG. 10 is an elevation of the locking means of FIG. 8.

The locking means may be as described with reference to FIGS. 5 and 6 or as shown in FIG. 8 to 10. As shown in FIGS. 8 to 10 the locking means comprises a locking member 30 in the form of a disc which is permanently mounted on one of the split end portions 14 of the ring by means of a pin 31 for angular movement about the axis of the pin. The ends 14 of the ring are recessed to accomodate the member 30 and within the recess are provided with a spigot 32 centered on the axis of the pin 31 and spanning the split in the ring. The spigot 32 has part circular peripherally and oppositely directed surfaces 33 which are undercut and are engaged by corresponding surfaces 34 on the locking member 30. The surfaces 33,34 are arranged so that in one angular position of the member 30 relative to the spigot 32, the surfaces 33,34 are fully engaged and the ring is locked, and so that in another position of the locking member 30 angularly spaced by 90° from the first position, the surfaces 33,34 are fully disengaged so that the ends 14 of the ring can move apart to permit radial expansion of the ring. The surfaces 34 on the member 30 are extended by lead-in surfaces 35 which tend to bring the split end portions 14 closer together as the member 30 is rotated to its locking position. The member 30 may be fixed in locked position by a threaded member 36, which may be similar to members 12x, which is engaged in a threaded opening in the member 30 and is screwed into the member 30 so that its inner end frictionally engages the outer surface of the ring.

The member 30 may, as shown, be provided with blind bores 37 in its outer surface for engagement by a U-shaped bar for rotating the member 30.

It will be appreciated that the above described connector is otherwise as described with reference to FIGS. 1 to 4.

Figure 11:
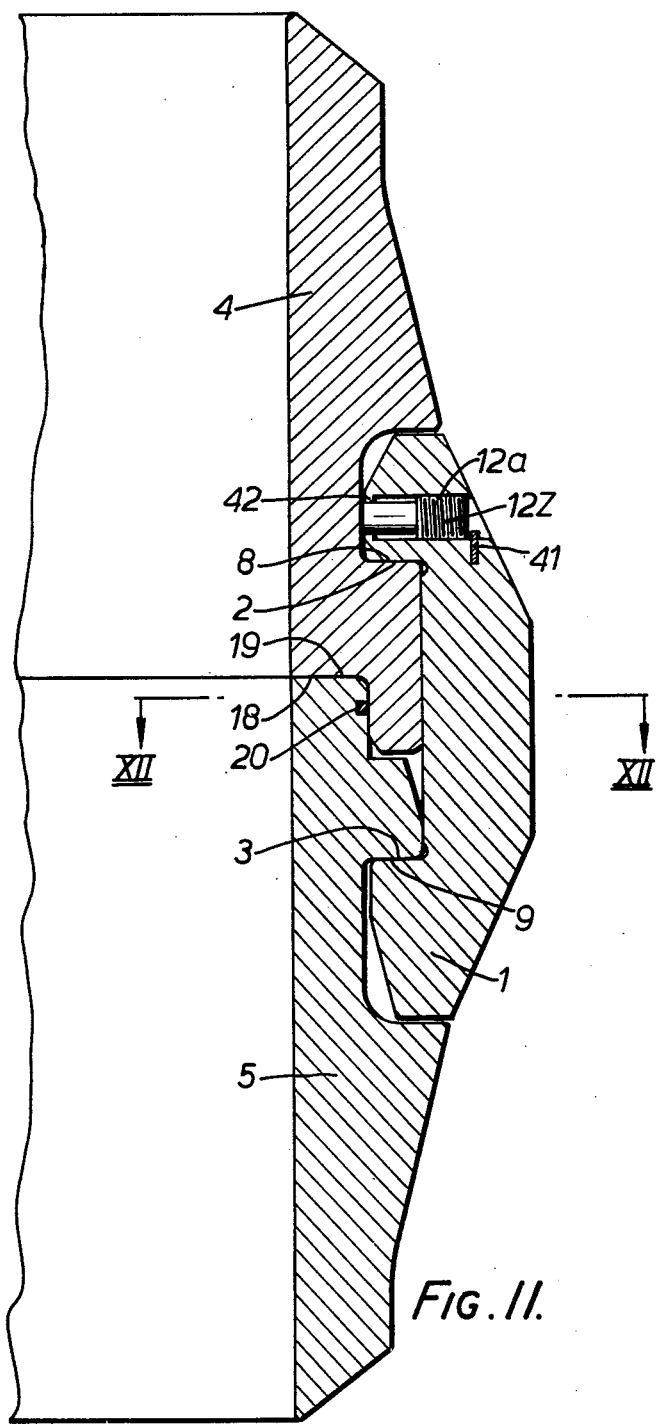
FIG. 11 is a vertical section similar to that of FIG. 2 showing another embodiment of pipe connector according to the present invention in operative condition.
Figure 12:
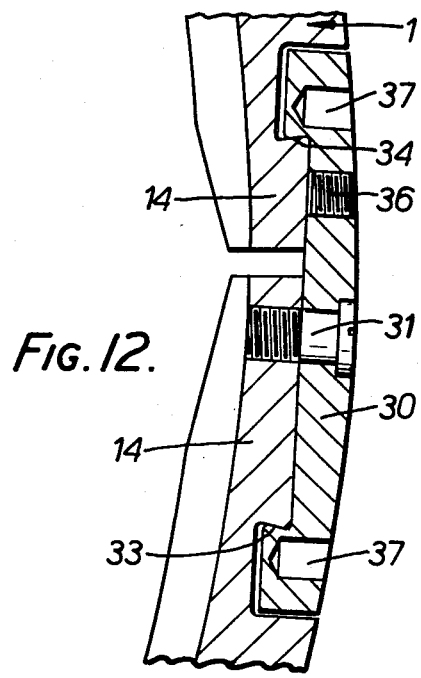
FIG. 12 is part of a section on the line XII—XII of FIG. 11 and showing the locking means of the ring of FIG. 11.
Figure 13:
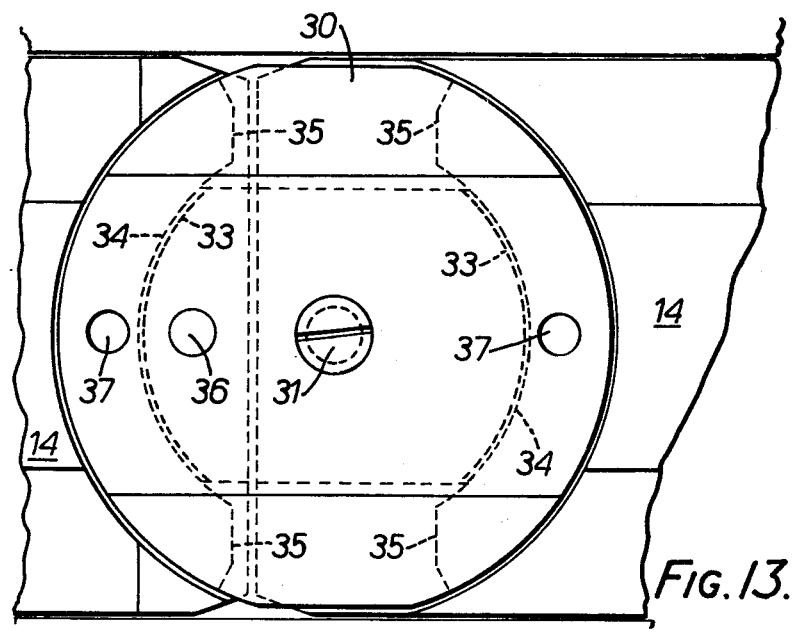
FIG. 13 is an elevation of the locking means of FIG. 12.

It has been found that, while the above described embodiment avoids the disadvantages of the first embodiment as regards the radial bursting force, the connector is not entirely suitable for use in connecting pipes which will in use be subject to axial loads from for example pile driving because it may not adequately hold the end surfaces of the pipes together. When the ring 1 of the above described embodiment is engaged around the ends of two pipes, there will be a clearance between the inclined surfaces 3,9 which must be provided to enable the ring 1 to engage the pipe 5. This disadvantage is overcome in the following embodiment in which the ring of the connector is additionally not subject to a radial bursting force, such forces being sustained axially by the ring. The embodiment is shown in FIGS. 11 to 13 and is similar to the embodiment of FIGS. 7 to 10 except that, in this embodiment, both pairs of surfaces 2,8 and 3,9 on the ring and pipes 4,5 lie in radial planes. The ring 1 is made to close tolerances so as to firmly engage the end portions of the pipes 4,5 but because the surfaces 2,3 8,9 all lie in radial planes any bursting force to which the ring 1 may be subject is taken axially by the ring there being no radial component. Additionally, because the ring 1 closely engages the end portions of the pipes 4,5 the abutting surfaces 18,19 of the pipes are held in firm engagement for pile driving.

In this embodiment the threaded openings 12a for the operating members 12z have been moved so that they extend through the appropriate arm of the U of the member 1 rather than, in the preceding embodiments, through the base of the U of the ring 1. This feature can of course be applied to the preceding two embodiments. This ensures that, even if the ring 1 is radially expanded to such an extent that surface 2 is moved out of engagement with surface 8, the ring 1 cannot be removed from the end portion of pipe 4 because such removal would be prevented by abutment of the members 12z with the surface 8 on the pipe 4. Additionally the form of the operating members 12z have been modified so that movement of the operating members is limited in both directions. Movement of each member 12z outwardly is limited by an abutment member 41 projecting radially into opening 12a and movement of each member 12z inwardly to expand the ring 1 is limited by an annular flange 42 at the inner end of the opening 12a. To permit use of flange 42, each operating member 12z comprises an outer threaded portion and an inner portion of reduced section which passes through the opening in the flange 42, the outer threaded portion abutting flange 42 in the innermost position of the member 12z.

The locking means for the split end portions of the ring of this embodiment is very similar to that of the embodiment of FIGS. 7 to 10 and like reference numerals have been used for the corresponding parts.

It will be appreciated that the above described connectors are simple in construction and operation and require few moving parts for operation which makes them well suited to offshore conditions. Additionally since axial loading on the pipes is taken by the abutted pipe end surfaces 18, 19 the connector is well suited for use with pipe strings required to withstand high axial loads.

When used for connecting the ends of metal pipe sections of pipe strings, the ring is made of high tensile steel.

It will also be appreciated that numerous modifications can be made to the connectors described above, for example, in the way in which the ring 1 is expanded and the way in which the ends of the ring are locked together. Additionally, in a further modification, the ring may be made so that, in its relaxed condition, it has dimensions corresponding for example to that of FIG. 3, in other words so that in this condition the pipe 5 can be freely inserted into it. With such an arrangement, coupling of the pipe ends by the ring is effected by contracting the ring around the pipe ends by drawing the ends of the ring together by applying tension to the ends of the ring or, for example, by providing the ring with screws which are threaded into the end portion of pipe 4.

What is claimed is:

1. A pipe connector for connecting the abutted end portions of two pipes each having an axis and each of which is provided with an outwardly extending surface directed away from the respective axis and pipe end and directed transverse to each said axis of said two pipes, said pipe connector comprising a split annular ring having an axis and a single split formed therein for surrounding said abutted pipe end portions substantially completely and defining a pair of inwardly extending surfaces directed transverse to said axis of said ring and towards each other and each engageable with a respective said surface on said pipe end portions, one of said surfaces of said ring having a greater inward radial extent than the other said surface such that in use said ring is permanently engaged with said corresponding one of said pipe end portions, said ring further comprising a relaxed condition wherein said ring is engageable with both of said pipe end portions, and operating means for causing the radial dimensions of said ring to increase to permit disengagement of said ring from said other pipe end portion.

2. A pipe connector as claimed in claim 1, wherein said operating means comprises a plurality of angularly spaced radial members, said radial members in operation bearing on said one pipe end portion.

3. A pipe connector as claimed in claim 1, wherein said pipe end portions are formed with circumferentially extending grooves which provide said radially outwardly extending surfaces, and said operating means bear against a bottom surface of said groove of said one pipe end portion.

4. A pipe connector as claimed in claim 1, wherein said surfaces on said pipe end portions and said ring lie in radial planes.

5. A pipe connector as claimed in claim 1, wherein said surfaces on said pipe end portions and said ring are correspondingly mutually inclined in a direction to converge outwardly of said pipe end portions.

6. A pipe connector as claimed in claim 5, wherein said surface on said one pipe end portion and said corresponding surface on said ring lie in radial planes.

7. A pipe connector as claimed in claim 1, wherein said surfaces on said pipe end portions and said ring are correspondingly mutually inclined in a direction to converge inwardly of said pipe end portions.

8. A pipe connector as claimed in claim 7, wherein said surface on said one pipe end portion and said corresponding surface on said ring lie in radial planes.

9. A pipe connector as claimed in claim 1, including locking means for engaging the ends of said ring at said split to prevent radial expansion of said ring.

10. A pipe connector as claimed in claim 9, wherein said split end portions of said ring are provided with oppositely circumferentially directed surfaces, and said locking means includes a locking member provided with corresponding surfaces directed towards each other and for engagement with said surfaces on said split end portions of said ring.

11. A pipe connector as claimed in claim 10, wherein said surfaces on said split end portions of said ring extend transversely of the circumferential extent of said ring in mutually inclined planes, said locking member being engageable therewith by movement in a direction transversely of said circumferential extent of said ring.

12. A pipe connector as claimed in claim 11, wherein said surfaces on said split end portions of said ring and said corresponding surfaces on said locking member are undercut to prevent removal of said locking member in the radial direction of said pipe end portions.

13. A pipe connector as claimed in claim 10, wherein said surfaces on said split end portions of said ring lie on a circle and said locking member is engageable therewith by angular movement about an axis passing through the centre of said circle.

14. A pipe connector as claimed in claim 13, wherein said centre of said circle lies on one of said split end portions of said ring, and said locking member is mounted on said one end portion of said ring for angular movement about said centre.

15. A pipe connector as claimed in claim 13, wherein said surfaces on said split end portions of said ring and said corresponding surfaces on said locking member are undercut to prevent removal of said locking member in the radial direction of said pipe end portions.

16. A pipe connector as claimed in claim 1, wherein said ring is generally U-shaped in radial section and comprises two arms each providing one of said surfaces, that one of said arms providing said one surface being longer than the other said arm.

17. A pipe connector for connecting the abutted end portions of two pipes each having an axis and each of which is provided with an outwardly extending surface directed away from the respective axis and pipe end and directed transverse to each said axis of said two pipes, said pipe connector comprising a split annular ring having an axis and a single split formed therein for surrounding said abutted pipe end portions substantially completely and defining a pair of inwardly extending surfaces directed transverse to said axis of said ring and towards each other and each engageable with a respective said surface on said pipe end portions, one of said surfaces of said ring having a greater inward radial extent than the other said surface for permanent engagement of said ring with said corresponding one of said pipe end portions operating means for causing the radial dimensions of said ring to change to permit engagement and disengagement of said ring from said other pipe end portion, wherein said ring comprises a relaxed condition in which said ring is engageable with said other pipe end portion, wherein said operating means is adapted to cause radial expansion of said ring, said ring being resiliently radially expandable, and wherein said operating means comprises a plurality of angularly spaced radial members, said ring being provided with radial openings into which said radial members are threaded, said radial members in operation bearing on said one pipe end portion.

18. A pipe connector as claimed in claim 17, wherein said pipe end portions are formed with circumferentially extending grooves which provide said radially outwardly extending surfaces, and said operating means bear against said bottom surface of said groove of said one pipe end portion.

19. A pipe connector as claimed in claim 18, wherein said surfaces on said pipe end portions and said ring lie in radial planes.

20. A pipe connector as claimed in claim 16, wherein said ring is generally U-shaped in radial section and comprises two arms each providing one of said surfaces, that one of said arms providing said one surfacce being longer than the other said arm.

21. A pipe connector for connecting the abutted end portions of two pipes each having an axis and each of which is provided with an outwardly extending surface directed away from the respective axis and pipe end and directed transverse to each said axis of said two pipes, said pipe connector comprising a split annular ring having an axis and a single split formed therein for surrounding said abutted pipe end portions substantially completely and defining a pair of inwardly extending surfaces directed transverse to said axis of said ring and towards each other and each engageable with a respective said surface on said pipe end portions, one of said surfaces of said ring having a greater inward radial extent than the other said surface such that in use said ring is permanently engaged with said corresponding one of said pipe end portions, operating means for causing the radial dimensions of said ring to change to permit engagement and disengagement of said ring from said other pipe end portion, locking means for engaging the ends of said ring at said split to prevent radial expansion of said ring, wherein said split end portions of said ring are provided with opposite circumferentially directed surfaces, said locking means including a locking member provided with corresponding surfaces directed towards each other and for engagement with said surfaces on said split end portions of said ring, and wherein said surfaces on said split end portions of said ring lie on a circle and said locking member is engageable therewith by angular movement about an axis passing through the center of said circle.

22. A pipe connector as claimed in claim 21, wherein said center of said circle lies on one of said split end portions of said ring, and said locking member is mounted on said one end portion of said ring for angular movement about said center.

23. A pipe connector as claimed in claim 21, wherein said surfaces on said split end portions of said ring and said corresponding surfaces on said locking member are undercut to prevent removal of said locking member in the radial direction of said pipe end portions.

24. A pipe connector for connecting the abutted end portions of two pipes each having an axis and each of which is provided with an outwardly extending surface directed away from the respective axis and pipe end and directed transverse to each said axis of said two pipes, said pipe connector comprising a split annular ring having an axis and a single split formed therein for surrounding said abutted pipe end portions substantially completely and defining a pair of inwardly extending surfaces directed transverse to said axis of said ring and towards each other and each engageable with a respective said surface on said pipe end portions, one of said surfaces of said ring having a greater inward radial extent than the other said surface such that in use said ring is permanently engaged with said corresponding one of said pipe end portions, operating means for causing the radial dimensions of said ring to change to permit engagement and disengagement of said ring from said other pipe end portion, and wherein said operating means comprises a plurality of angularly spaced radial members, said ring being provided with radial openings in which said operating means operates said radial members upon said one pipe end portion.

25. A pipe connector for connecting a first end portion of a first pipe to a second end portion of a second pipe by substantially surrounding said first and second end portions, said first and second pipes each having a longitudinal axis, said first end portion of said first pipe having a connecting surface portion formed therein extending outwardly from and transverse to said longitudinal axis of said first pipe and said second end portion of said second pipe having a connecting surface portion formed therein extending outwardly from and transverse to said longitudinal axis of said second pipe, and wherein said pipe connector comprises:

a resilient radially expandable annular ring having a longitudinal axis and having a single split formed therein, said ring comprising a first connecting surface formed therein extending inwardly toward and transverse to said longitudinal axis of said ring for confronting said connecting surface portion formed in said first end portion of said first pipe, said ring further comprising a second connecting surface formed therein extending inwardly and transverse to said longitudinal axis of said ring for confronting said connecting surface portion formed in said second end portion of said second pipe;

said first connecting surface of said ring comprising a greater inward radial extent than said second connecting surface of said ring for permanent engagement of said ring with said first end portion of said first pipe; and operating means for causing radial expansion of said ring from a relaxed condition to a radially expanded condition for facilitating engagement and disengagement of said first and second pipes.

* * * * *